United States Patent Office 2,757,512
Patented Aug. 7, 1956

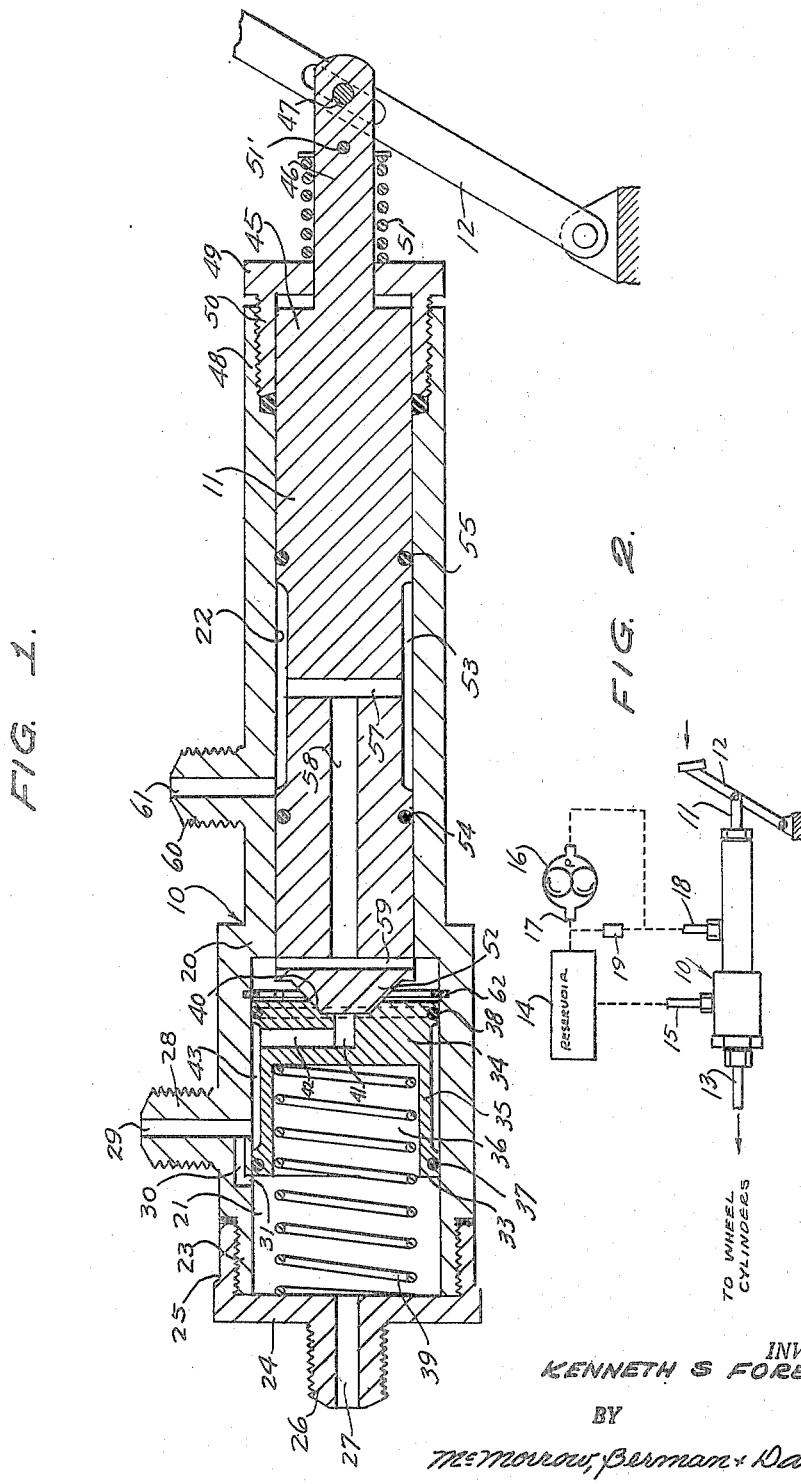

2,757,512
HYDRAULIC BRAKE SYSTEM WITH HYDRAULIC BOOSTER

Kenneth S. Foreman, Bunker Hill, Ill.

Application July 17, 1953, Serial No. 368,724

2 Claims. (Cl. 60—54.6)

This invention relates to hydraulic vehicle brake systems and more particularly to a hydraulic vehicle brake system having a power operated hydraulic booster for assisting manual effort in applying the vehicle brakes.

It is among the objects of the invention to provide an improved hydraulic vehicle brake system including a power operated hydraulic booster which is controlled by the brake pressure and assists the manual effort in applying the brakes in direct proportion to the pressure exerted on the brake pedal; which does not at any time completely relieve the pressure exerted on the brake pedal, but maintains the pedal pressure proportional to the fluid pressure exerted on the brake cylinders, so that the operator of the vehicle retains the feel of the resistance of the brakes at all times; which reduces the manual effort by a predetermined amount, but not to such an extent as to cause locking of the brakes; which utilizes a small sized pump driven by the vehicle engine for providing the booster pressure; which does not interfere in any way with the manual operation of the brakes in the event of failure of the booster mechanism; and which is simple and durable in construction, economical to manufacture, easy to install, and effective and efficient in operation.

Other objects and advantages will become apparent from a consideration of the following description and the appended claims in conjunction with the accompanying drawing wherein:

Figure 1 is a longitudinal, medial cross sectional view through a brake system master cylinder equipped with a hydraulic booster illustrative of the invention; and Figure 2 is a diagrammatic view of the portion of the brake system including the master cylinder, the hydraulic booster and the booster pump.

With continued reference to the drawing, the portion of the brake system illustrated in Figure 1 comprises a combined master cylinder and hydraulic booster, generally indicated at 10, and including a brake actuating plunger 11, an operator controlled brake pedal 12 connected to one end of the plunger, a fluid line 13 leading from the end of the master cylinder assembly remote from the brake pedal to the associated vehicle wheel brakes, a brake fluid reservoir 14, a hydraulic conduit 15 connecting the reservoir to the master cylinder, an engine operated brake booster pump 16, a conduit 17 connecting the inlet of the pump to the reservoir 14, and a fluid conduit 18 connecting the outlet of the pump 16 to the booster portion of the master cylinder assembly. A pressure relief or safety valve 19 is preferably interposed between the outlet and the inlet of the pump 16, so that the pump pressure will not, at any time, exceed a predetermined value.

The master cylinder assembly 10 comprises an elongated housing 20 of substantially cylindrical shape having in one end portion thereof a master cylinder chamber 21 and in the other end portion thereof a booster valve chamber 22. The chambers 21 and 22 are coaxially disposed in end to end relationship to each other and the master cylinder chamber 21 has a greater diameter than the booster valve chamber 22. At its end in which the master cylinder chamber is provided, the housing 20 is provided with an externally screw threaded terminal portion 23 of reduced diameter and an end cap 24 having an internally screw threaded, cylindrical flange 25 is threaded onto the terminal portion 23 of the housing and is provided centrally thereof with an outwardly projecting, externally screw threaded fitting 26 to which the brake conduit 13 is connected and which is provided with a coaxial bore 27 extending through the fitting to the adjacent end of the chamber 21. The portion of the housing including the brake cylinder chamber 21 is also provided adjacent its mid-length position with a radially projecting, externally screw threaded boss or fitting 28 to which the conduit 15 connecting the brake cylinder chamber to the fluid reservoir 14 is connected and which is provided with a coaxial bore 29 extending through the fitting to the chamber 21. A branch passage 30 is provided in the wall of the housing 10 surrounding the chamber 21 and leads from the bore 29 near the inner end of this bore through the housing wall toward the end wall 24 and is provided at its end remote from the bore 29 with a port 31 communicating with the chamber 21 at a location spaced a predetermined distance from the inner surface of the end wall 24 of the master cylinder chamber.

A cylindrical piston 33 is disposed in the brake cylinder chamber 21 for reciprocation in this cylinder and includes a cylinder head 34 and a cylindrical skirt 35 extending from one end of the piston head 34 and surrounding a cavity 36 in the piston. The piston is provided with annular grooves of substantially circular shape in the outer surface thereof disposed one near each end of the piston and sealing rings 37 and 38 are disposed one in each of these grooves to seal the piston to the wall of the chamber 21, these rings being preferably formed of an elastic material, such as a synthetic rubber material, and being of circular cross sectional shape. A coiled compression spring 39 is disposed in the chamber 21 with one end bearing against the inner surface of the end wall 24 of the chamber, and its other end bearing against the surface of the piston head 34 nearest the end wall 24 and this spring resiliently urges the piston 33 toward the end of the chamber 21 remote from the end wall 24.

The end of the piston head 34 remote from the end wall 24 is provided with a centrally located and inwardly tapered port 40 having a maximum diameter which is only a fraction of the diameter of the piston head, and a fluid passage including a portion 41 leading from the inner end of the port 40 partly through the thickness of the piston head 34 and a portion 42 leading from the inner end of the portion 41 radially of the piston head connects the port 40 with an elongated, shallow groove 43 extending around the piston between the sealing rings 37 and 38.

The annular groove 43 in the piston 34 communicates, at all times, with the inner end of the bore 29 in the fitting 28 leading to the brake fluid reservoir and, when the piston is moved by the spring 39 to its retracted position, as illustrated in Figure 1, the port 31 at the end of the branch passage 30 communicates with the space in the chamber 21 between the piston and the end wall 24 to supply make-up fluid from the reservoir to this space and to the brake lines and brake cylinders to maintain the brake system filled with hydraulic fluid. As soon as the piston 33 is moved a short distance in a brake applying direction, the port 31 is lapped by the piston 33, cutting off the passage 30, so that pressure can be applied to the fluid between the piston 33 and the wheel brake cylinders and the fluid cannot escape from the master cylinder chamber 21 back to the fluid reservoir.

An elongated valve plunger 45 of cylindrical shape is disposed in the booster valve chamber 22 for reciprocation in this cylinder and has at its end remote from the piston 33 a coaxial extension 46 of reduced diameter pivotally connected at its distal end to the brake pedal 12 intermediate the length of the brake pedal by a pivotal, lost motion connection 47. The housing 10 is provided at its end remote from the end wall 24 with an internally screw threaded terminal portion 48 of increased internal diameter and an end cap 49 having an externally screw threaded annular flange 50 is threaded into the terminal portion 48 of the housing and provided with a centrally disposed opening through which the extension 46 of the valve plunger 45 extends. A coiled compression spring 51 surrounds the plunger extension 46 between the outer surface of the end cap 49 and an abutment pin 51' extending transversely through the extension and resiliently urges the plunger 11 to a position in which the end of the plunger from which the extension projects is against the inner side of the end cap.

At its end remote from the extension 46, the plunger 45 is provided with an outwardly tapered terminal formation 52 which fits into and closes the port 40 in the piston 33 when this end of the valve plunger presses against the adjacent end of the piston. Intermediate its length the plunger 45 is provided with an elongated, annular groove 53 and is provided at locations spaced from the opposite ends of the groove 53 with seal receiving grooves in which seal rings 54 and 55, similar to the seal rings 37 and 38, are mounted, to seal the plunger at the respectively opposite ends of the groove 53 to the wall of the booster valve chamber 22. A fluid passage is provided in the plunger 45 and includes a portion 57 extending diametrically of the plunger and communicating at its opposite ends with the groove 53, a portion 58 extending coaxially of the plunger from the portion 57 toward the end of the plunger having the tapered formation 52 thereon, and a portion 59 extending diametrically of the plunger with its ends opening to the cylindrical surface of the plunger immediately inwardly of the tapered formation 52 and its mid-length portion communicating with the adjacent end of the passage portion 58.

An externally screw threaded fitting 60 projects radially from the portion of the housing 10 including the booster valve chamber 22 for connection to the conduit 18 leading to the outlet of the booster pump 16, and this fitting is provided with a coaxial bore 61, the inner end of which communicates with the groove 53 in the valve plunger 45, when the brakes are applied.

In the operation of the brake system, when there is no foot pressure on the foot pedal 12, the spring 51 moves the plunger 45 rearwardly of the postion illustrated in Figure 1, closing the inner end of the bore 61 and the ends of the passage 59. The output of the booster pump 16 is cut off from the master cylinder and, if the pump operates, its output is returned through the pressure relief valve 19 to its inlet or to the reservoir 14.

At this time, the spring 39 holds the piston 33 against an abutment in the form of a snap ring 62 set into an internal groove in the portion of the housing including the chamber 21 and near the end of this chamber into which the bore 22 opens, the piston being in the position illustrated in Figure 1. The port 40 in the piston head is now spaced from the terminal formation 52 on the adjacent end of the plunger 11.

When foot pressure is applied to the brake pedal 12, the plunger 45 is forced toward the piston 33 against the force of spring 51 and the tapered, terminal formation 52 on the plunger enters and closes the port 40 in the adjacent end of the piston. At the same time, the groove 53 laps the inner end of the bore 61 and the ends of passage 59 move out of bore 22 into the adjacent end portion of chamber 21. Hydraulic fluid delivered under pressure by the pump 16 will now enter the space between the piston and the end of the chamber 21 adjacent the booster valve chamber 22, and act on the area of the piston head surrounding the terminal formation 52 of the valve plunger assisting the plunger in moving the piston in a brake applying direction. The end area of the plunger 11 projecting into chamber 21 is so proportioned to the area of the end of the piston 33, that a progressively increasing force on the brake pedal is required to increase the pressure of the hydraulic fluid acting on the wheel brakes of the vehicle and the feel of the resistance of the brakes is thereby retained. As soon as the foot pressure on the pedal is sustained at any desired pressure with no further increase in the pressure exerted, the pressure of the pump supplied fluid against the head of the piston will force the piston away from the terminal formation 52 of the valve plunger, permitting the pump supplied fluid to escape back to the reservoir at substantially the same rate at which the fluid is supplied by the pump, and the piston 33 will then remain substantially stationary at the instant brake applying position of this piston and, as soon as the pressure on the brake pedal is released, the valve plunger 45 will be withdrawn to its retracted position, the pump fluid will immediately escape from the end of the master cylinder chamber 21 adjacent the valve plunger and the spring 39 will return the piston 33 to its retracted position, releasing the vehicle brakes. The pressure fluid delivered by the pump thus assists the manual effort in applying the brakes, but does not, at any time, take over the manual effort, so that the brakes are always under accurate manual control and the full sensitivity of the brake system is retained.

A part of the force resisting movement of the brake pedal in a brake applying direction is also produced by the pressure of the fluid in the end of the chamber 21 into which the valve plunger 45 projects, acting on the end of the valve plunger surrounding the port 40 in the piston when the plunger is in sealing engagement with this port. The effective area of this end of the valve plunger is, however, much less than the effective area of the head of the piston 33, so that there will be a sufficient resultant force acting on the piston to assist in the movement of the piston in the brake applying direction. However, since the pressure of the fluid acting or reacting on the end of the valve plunger is the same as the pressure of the pump fluid acting on the piston, the resistance to movement of the brake pedal is somewhat increased by the reaction of the fluid on the end of the plunger adjacent the piston 33 over the reactive force of the piston itself, so that the resistance of the brake pedal to movement in a brake applying direction is accurately responsive to the pressure resistance of the vehicle wheel brakes and the full sensitivity of the brake system is retained.

Preferably, the pressure relief valve 19 is so adjusted that the pump 16 will not supply fluid at a sufficiently high pressure to cause accidental locking of the brakes when the brakes are applied by manual operation of the pedal 12.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a hydraulic vehicle brake system having a brake pedal, the improvement comprising: a master cylinder assembly including a housing formed with a piston cylinder having a reservoir port between its ends and with a valve chamber communicating with one end of the piston cylinder and having a pumping port, the cylinder having a braking port at its other end; a plunger sliding in the chamber and adapted at one end for connection to said pedal, the plunger sliding between a brake-releasing rest position and a brake-applying working position and being spring biased to its rest position, the plunger being formed with a pumping passage having inlet and outlet ends both of which are closed by the chamber wall in the rest position of the plunger, the inlet end of the passage communicating with the pumping port and the outlet end communicating with said one end of the cylinder in the working position of the plunger; a pump having its output connected in communication with the pumping port; a reservoir connected in communication with the reservoir port and with the pump input; a piston sliding in the cylinder and formed with a passage having an inlet end opening through one end of the piston and an outlet end opening through the side of the piston, the outlet end of the piston passage communicating with the reservoir port, the piston sliding between a first position in which the inlet end of the piston passage is closed by the other end of the plunger, and a second position in which the piston is shifted out of contact with said other end of the plunger in the direction of the braking port by pressure of fluid pumped through the plunger passage, to open the inlet end of the piston passage and thereby communicate said one end of the cylinder with the reservoir port, the pumping pressure of the pump being at a value effective to shift the piston to and sustain it in its second position following movement of the plunger fully from its rest to its working position.

2. In a hydraulic vehicle brake system having a brake pedal, the improvement comprising: a master cylinder assembly including a housing formed with a piston cylinder having a reservoir port between its ends, and with a valve chamber communicating with one end of the piston cylinder and having a pumping port, the cylinder having a braking port at its other end; a plunger sliding in the chamber and adapted at one end for connection to said pedal, the plunger sliding between a brake-releasing rest position and a brake-applying working position and being spring biased to its rest position, the plunger being formed with a pumping passage having inlet and outlet ends both of which are closed by the chamber wall in the rest position of the plunger, the inlet end of the passage communicating with the pumping port and the outlet end of the passage communicating with said one end of the cylinder in the working position of the plunger; a pump having its output connected in communication with the pumping port; a reservoir connected in communication with the reservoir port and with the pump input; a piston sliding in the cylinder and formed with a passage having an inlet end opening through one end of the piston and an outlet end opening through the side of the piston, the outlet end of the piston passage communicating with the reservoir port, the piston sliding between a first position in which the inlet end of the piston passage is closed by the other end of the plunger, and a second position in which the piston is shifted out of contact with said other end of the plunger in the direction of the braking port by pressure of fluid pumped through the plunger passage, to open the inlet end of the piston passage and thereby communicate said one end of the cylinder with the reservoir port, the pumping pressure of the pump being at a value effective to shift the piston to and sustain it in its second position following movement of the plunger fully from its rest to its working position, said cylinder having in its side at a location between the reservoir port and said other end of the cylinder an exhaust port communicating between said other end of the cylinder and the reservoir, the piston in its first position uncovering the exhaust port to relieve the hydraulic pressure exerted through the braking port, and covering said exhaust port on initial movement of the piston from its first toward its second position.

References Cited in the file of this patent

UNITED STATES PATENTS

| | | |
|---|---|---|
| 2,318,756 | Chouings | May 11, 1943 |
| 2,407,097 | Porter | Sept. 3, 1946 |
| 2,410,269 | Chouings | Oct. 29, 1946 |
| 2,517,005 | MacDuff | Aug. 1, 1950 |
| 2,544,042 | Pontius III | Mar. 6, 1951 |

FOREIGN PATENTS

| | | |
|---|---|---|
| 384,678 | Great Britain | Dec. 9, 1932 |